United States Patent
Kim et al.

(10) Patent No.: US 9,015,019 B1
(45) Date of Patent: Apr. 21, 2015

(54) RADIO ACCESS NETWORK SIMULATOR

(75) Inventors: John Y. Kim, Centreville, VA (US); Dale Thompson Peters, Jr., McLean, VA (US); Thuy Thomas Tran, Fairfax, VA (US)

(73) Assignee: Nextel Communications Inc., Reston, VA (US)

( * ) Notice: Subject to any disclaimer, the term of this patent is extended or adjusted under 35 U.S.C. 154(b) by 2064 days.

(21) Appl. No.: 11/595,121

(22) Filed: Nov. 8, 2006

(51) Int. Cl.
  G06G 7/62   (2006.01)
  H04W 74/00  (2009.01)
  H04W 16/22  (2009.01)

(52) U.S. Cl.
  CPC ............ *H04W 74/00* (2013.01); *H04W 74/002* (2013.01); *H04W 16/22* (2013.01)

(58) Field of Classification Search
  USPC ........ 455/525, 413; 379/26.01; 370/250, 335, 370/351, 254; 703/23
  See application file for complete search history.

(56) References Cited

U.S. PATENT DOCUMENTS

| | | | |
|---|---|---|---|
| 6,111,857 A * | 8/2000 | Soliman et al. | 370/254 |
| 6,999,766 B1 * | 2/2006 | Padovani | 455/437 |
| 2005/0055195 A1 * | 3/2005 | Hernandez-Mondragon et al. | 703/23 |
| 2006/0019679 A1 * | 1/2006 | Rappaport et al. | 455/456.5 |
| 2006/0121916 A1 * | 6/2006 | Aborn et al. | 455/456.5 |
| 2006/0140125 A1 * | 6/2006 | Ottinger et al. | 370/241 |
| 2006/0198359 A1 * | 9/2006 | Fok et al. | 370/351 |
| 2006/0205398 A1 * | 9/2006 | Seckendorf et al. | 455/423 |
| 2006/0258336 A1 * | 11/2006 | Sajor et al. | 455/413 |
| 2007/0014263 A1 * | 1/2007 | Ferrato et al. | 370/335 |
| 2007/0191054 A1 * | 8/2007 | Das et al. | 455/525 |
| 2008/0260109 A1 * | 10/2008 | Turina | 379/26.01 |
| 2009/0028059 A1 * | 1/2009 | Barbaresi et al. | 370/250 |

OTHER PUBLICATIONS

Xiang Zeng, Rajive Bagrodia, Mario Gerla GloMoSim: A Library for Parallel Simulation of Large-scale Wireless Networks 1087-4097/98, IEEE 1998.*

Juan Ramiro-Moreno, Klaus I. Pedersen, Preben E. Nogensen Network Performance of Transmit and Receive Antenna Diversity in HSPDA under Different Packet Scheduling Strategies 0/7803-7757-5/03, IEEE 2003.*

* cited by examiner

*Primary Examiner* — Omar Fernandez Rivas
*Assistant Examiner* — Cuong Luu

(57) ABSTRACT

A simulation platform for early evaluation of the performance of a cdma2000 radio access network uses a generic network simulator as the core simulation engine. The simulation platform includes a mobile device simulation module configured to simulate communications between mobile devices and radio access networks, and a network application simulation module configured to simulate network application functionality. In one embodiment, the network simulation engine, mobile device simulation module and the network application simulation module are linked to emulate end-to-end network communications.

18 Claims, 13 Drawing Sheets

RADIO ACCESS NETWORK SIMULATOR

FIELD OF THE INVENTION

The present invention relates generally to the field of cellular telecommunications systems, and in particular, to the development of a system-level simulator to model the behaviour of an advanced third generation cellular radio access network.

BACKGROUND OF THE INVENTION

There is a growing need for a carrier or operator to independently evaluate various next generation wireless technologies in order to assess, at an early stage in the development, the impact of specific implementation features on performance. A simulation platform provides the ability to progressively design and test proprietary components leading to a system solution. Its intelligent use can save R&D dollars by reducing design problems before the building of prototypes and actual products. In addition, it enables the early and forward communication of the advantages of an innovation and its implementation. The ability to demonstrate early can provide significant market advantage when inviting business from potential clients. Such simulation platforms are often built from a combination of commercially available and internal developments and the methods of usage need to be tuned to the internal development processes and the product development objectives. Because of this heterogeneity, importance is attached not only on the development but also to the methods of usage within the development process of an organization as the development progresses from concept to reality.

In the context of a digital cellular communications system, such as cdma2000, each data bit is modulated and transmitted with a unique high rate code known to the receiving system, this modulation entailing the bandwidth of operation to be expanded or "spread". Codes are mathematical in origin and great importance is attached to the discovery of codes that are "orthogonal" to each other. Orthogonality refers to the exclusiveness of a code. Data which are spread by many different orthogonal codes can, however, be transmitted simultaneously, enabling savings in system resources, and demodulated uniquely at the different receivers. During a call made on a digital cellular system there are numerous exchanges of data, signalling and pilot message transmissions between the base station and the mobile. Different kinds of message transmissions may contain different codes, spreading rates, modulations and signal strengths. Each of these consumes system resources and the goal of an efficient network is to minimize use of system resources while offering competitive performance to its users. Newer standards, such as cdma2000, provide greater flexibility of operation, tighter control, and higher complexity algorithms and signal processing in the quest for better quality of service. This increases the importance of methods and apparatus for early verification of the system.

A simulation platform would need to provide multiple cell environments with various mobility and Quality of Service (QoS) needs, provide visibility of cross-layer interactions, compare the result of changes in features and parameters and output impact on performance, display results and statistical distributions, and support simultaneous forward (base station to mobile) and reverse (mobile to base station) link simulations. When higher granularity is needed on particular areas in the simulation, the simulator must have provision to include other commercial or proprietary lower link level modules and simulations.

Although numerous simulator developments exist, there is a lack of cohesion between the development and the methods of usage within the development process. There is, in particular, no formal or known approach or methodology regarding the use of such commercially-available simulators to assess the dynamically changing quality of operation of a cellular network depending on the channel conditions and on user traffic. Neither is there formal methodology for deploying a market-critical Push-to-Talk/VoIP application.

By way of reference, OPNET Technologies, Inc. based in Bethesda, Md. develops and markets a generic simulation toolkit under the registered trademark OPNET™ which requires significant innovation, tuning and characterization in order to be made useful for any particular application. The OPNET™ simulation toolkit is basically an event driven simulation engine. An event is a request for a particular activity to occur at a particular point in time. Time, in the simulation, advances when the event occurs. The simulation engine maintains a single global event list and all objects access a shared simulation time clock. Events are scheduled on the list in chronological order and an event may have data associated with it. An event is removed from the list when it has been processed. Some events may have to be initialized on the list. An event list is dynamic as events are always being added and deleted from the list. An event is pending until it is executed and pending events can be cancelled. Simulation time advances only when an event with a later time is taken from the list. No simulation clock advance occurs during an invocation of a process model nor does it advance during transition between states. There are two kinds of states in which the basic finite state machine on which processes are modelled may reside. Forced states are those in which a process invokes the 'enter' and then the 'exit' executives, evaluates the condition statements associated with transitions and if exactly one condition evaluates to true, then that transition is executed. Unforced states are those in which the process invokes the enter executive and stops after this. It then releases control to the simulation kernel and becomes idle, resuming at the suspension point and executing the exit executives when next invoked and followed by executing a transition based on the condition that is true. A process model must be in an unforced state for time to advance. These fundamental software-oriented characteristics require a level of abstraction between the real-life system to be simulated and the simulation platform. As such, there is need in the art for a radio access simulator for evaluating signal processing and control.

SUMMARY OF TILE INVENTION

A system and method for evaluating radio access network performance are disclosed and claimed herein. In one embodiment, a method includes configuring a network simulation engine to simulate radio access network communications, configuring a mobile device simulation module to simulate communications between mobile devices and radio access networks, and configuring a network application simulation module to simulate network application functionality. The method further includes linking the network simulation engine, mobile device simulation module and the network application simulation module to emulate end-to-end network communications, and then generating network performance information based on outputs from the network simulation engine, mobile device simulation module and/or the network application simulation module.

Other objects, advantages and novel features of the present invention will become apparent from the following detailed description of the invention when considered in conjunction with the accompanying drawings.

DETAILED DESCRIPTION OF THE EXEMPLARY EMBODIMENTS

Figure 1:
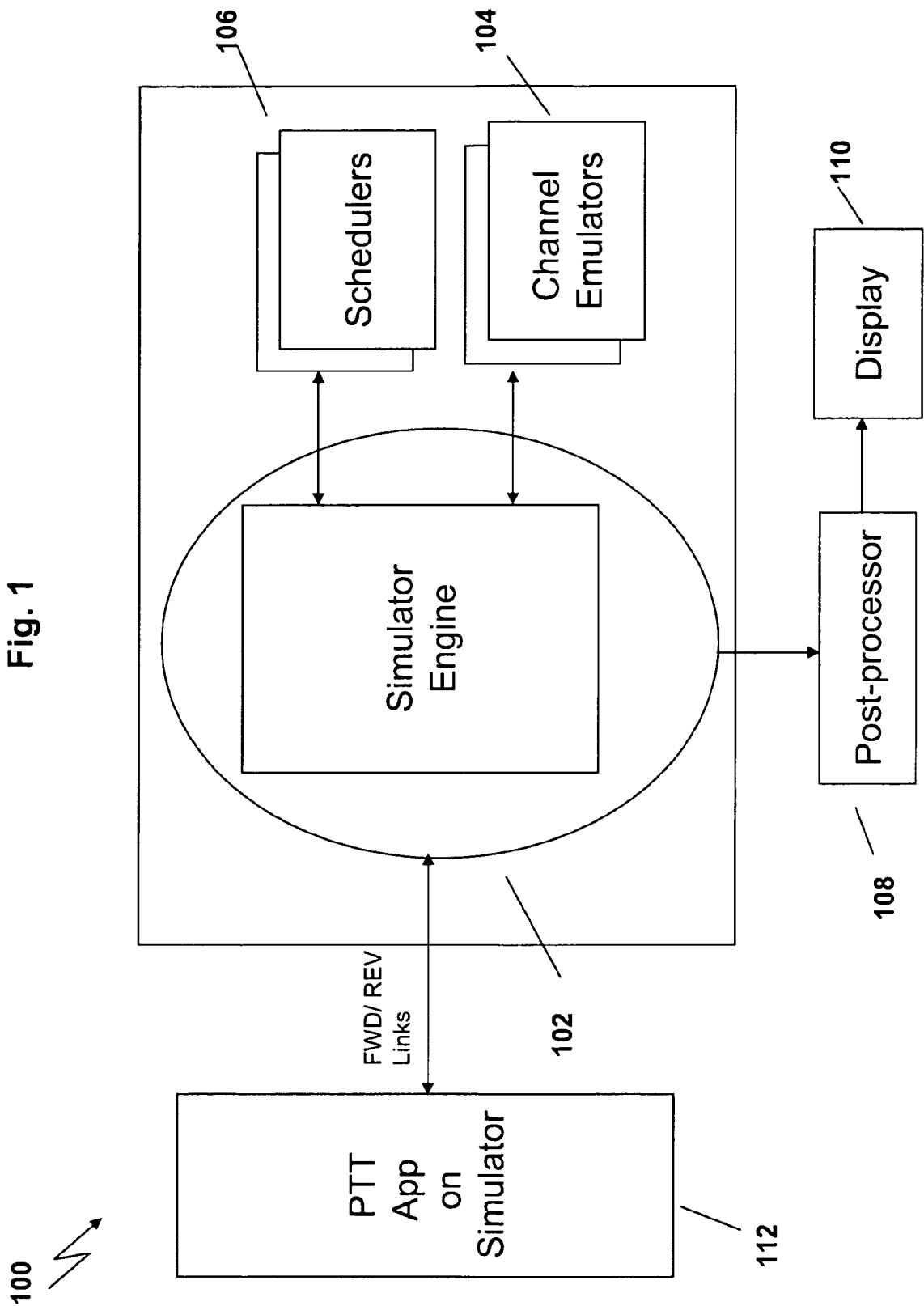
FIG. 1 illustrates one embodiment of a network simulator expanded to include a Push-to-Talk application built using a generic simulation engine.

A method and a simulation platform for digital cellular system performance verification is described here which, in one embodiment, may enable continuing up-front evaluations of market critical applications. One embodiment of one such a Push-to-Talk (PTT) application is Qualcomm's high performance PTT (HPPTT) application marketed under the trademark Qchat™. It should be appreciated that the invention is equally applicable to other network applications. In one embodiment, the invention is usable to represent the end-to-end behavior of a cellular network employing code division multiple access (cdma) in as much detail and as accurately as possible from the gamut of Application Layers down to the Physical Layers and to provide scalability in the design so that new features or parameters or limits can be explored. Although the following description is largely in terms of the development of a cdma2000 digital cellular network, the disclosure relates to the simulation of other wireless communication networks.

The cdma 2000 1xEV-DO specification was driven by the design vision of a high rate wireless packet data system with substantial improvement in forward link capacity and coverage over traditional systems such as IS-95 and IS-2000. In addition to high throughput, the first version, Rev 0, provides QoS support to enable operators to offer a variety of applications with different throughput and latency requirements. These improvements were accomplished by the use of large packet sizes encoded with low rate turbo codes, transmitted using adaptive modulation and coding, forward link physical layer hybrid automatic repeat request (H-ARQ), and forward link multi-user diversity, together with antenna diversity at the receiver. This invention is described herein in terms of network simulation for the 3GPP2 standard cdma 2000 1x EV-DO (Evolution-Data Optimized) system, Revision A. This is the most advanced offspring of the cdma2000 worldwide standard and will often be referred for brevity in this document as 'Rev A'. However, the invention is equally applicable to the simulation of other communication systems.

Certain aspects of the invention relate to the integration of the simulation system with commercially available general purpose simulation components and the adaptation, tuning and optimization of these components to be standards-compliant with the Rev. A specifications. The invention may provide evaluation capability for up and coming applications, such as third-party PTT and VoIP. The invention is extendable to other candidate 3G technologies, while also extending to 3.5G, 3.75G, 4G and beyond.

Some of the expected simulation results may include throughput distribution per sector with user and traffic flow, forward and reverse link CIR (carrier to interference) distributions, application end-to-end delay performance including jitter, outage probabilities, and hand-off performance. Results may be analyzed in user-defined granularities such as overall system, cell, service class, mobility levels and others.

Results generated by the simulation platform may be used to study the network performance impact due to various factors such as changes in system parameter settings, changes in cell size and coverage, introduction of new service applications, hand-off strategies, MIMO (Multiple Input Multiple Output) strategies, interference cancellation and other digital signal processing techniques.

Simulation results may be incorporated into commercial or proprietary post-processing, dimensioning and display tools to produce enhanced and easily understood deployment v cost scenarios. A method is exemplified and taught by particular instantiation to the building of an HPPTT application. The overall architecture of the simulation system is described herein, showing how a general purpose simulator may be optimized to include utility software programs particular to the context of the cdma2000 system.

FIG. 1 illustrates an exemplary simulation system 100 comprising a PTT application 112. In certain embodiments, the PTT application 112 being simulated is an HPPTT application and the generic simulation engine 102 is the OPNET™ simulation core to which customized channel emulators 104, customized schedulers 106, post processor 108 and a display unit 110 are attached.

Figure 2:
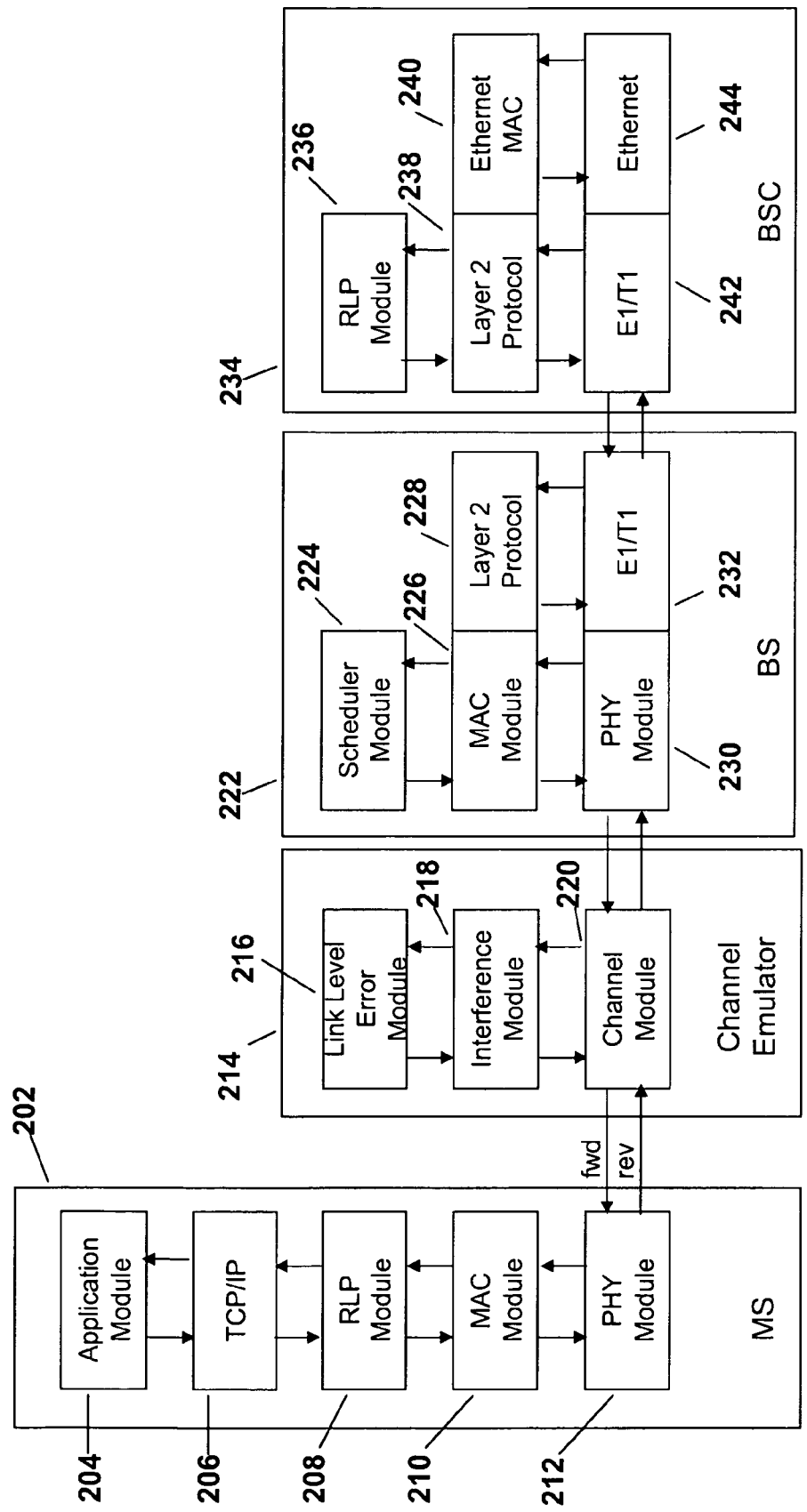
FIG. 2 illustrates one embodiment of the cdma2000 architecture being simulated using the simulation system of FIG. 1.

FIG. 2 portrays one embodiment of the cdma2000 architecture 200, as it is being simulated using the simulation system 100 of FIG. 1. As shown, the simulated architecture 200 comprises the forward link from the Random Access Network comprising the base station controller (BSC) 234 and base station (BS) 222 to the mobile station (MS) 202, via the wireless channel 214 and the reverse link from the MS 202 to the RAN network. The BSC 234 comprises the Radio Link Protocol (RLP) module 236, the Layer 2 Protocol embodiment 238 and the E1/T1 physical layers 242 interfacing to the corresponding E1/T1 layer 232 in the BS 222. It also comprises standard Ethernet MAC 240 and the Ethernet physical layers 244 interfacing it to the standard core network and switch (not shown). In this embodiment, the BSC module 234 functions to translate network addresses to MS addresses, and to forward packets to the appropriate BS.

The BS 222 comprises one or more experimental or final Scheduler modules 224, the embodiment of the Rev A MAC module 226, standardized E1/T1 Layer 2 Protocol 228, an E1/T1 Physical Layer 232 for communication with the corresponding Physical Layer 242 in BSC 234, and the embodiment of the physical layer 230 connecting it to the channel. The BS module architecture is further illustrated with reference to FIG. 4 below.

The wireless channel emulator module 214 comprises one or more channel modules 220 which mathematically or empirically mimic the propagation characteristics of the channel, one or more interference modules 218 which mathematically or empirically mimic interference sources, and a link level error module 216 to mimic errors such as packet loss or similar.

The MS 202 is depicted in a series of layers corresponding to the standardized OSI layers, starting with the physical layer radio frequency and baseband 212, the MAC 210 as specified for Rev A, the radio link protocol RLP 208, the TCP/IP (Transmission Control Protocol/Internet Protocol) layers 206 and finally the application layer 204, which in one embodiment is an HPPTT application. Note that the processes may not functionally entirely follow the OSI model partitioning largely due to the special requirements required of a typical application and also the typical requirements imposed by the channel.

Figure 3:
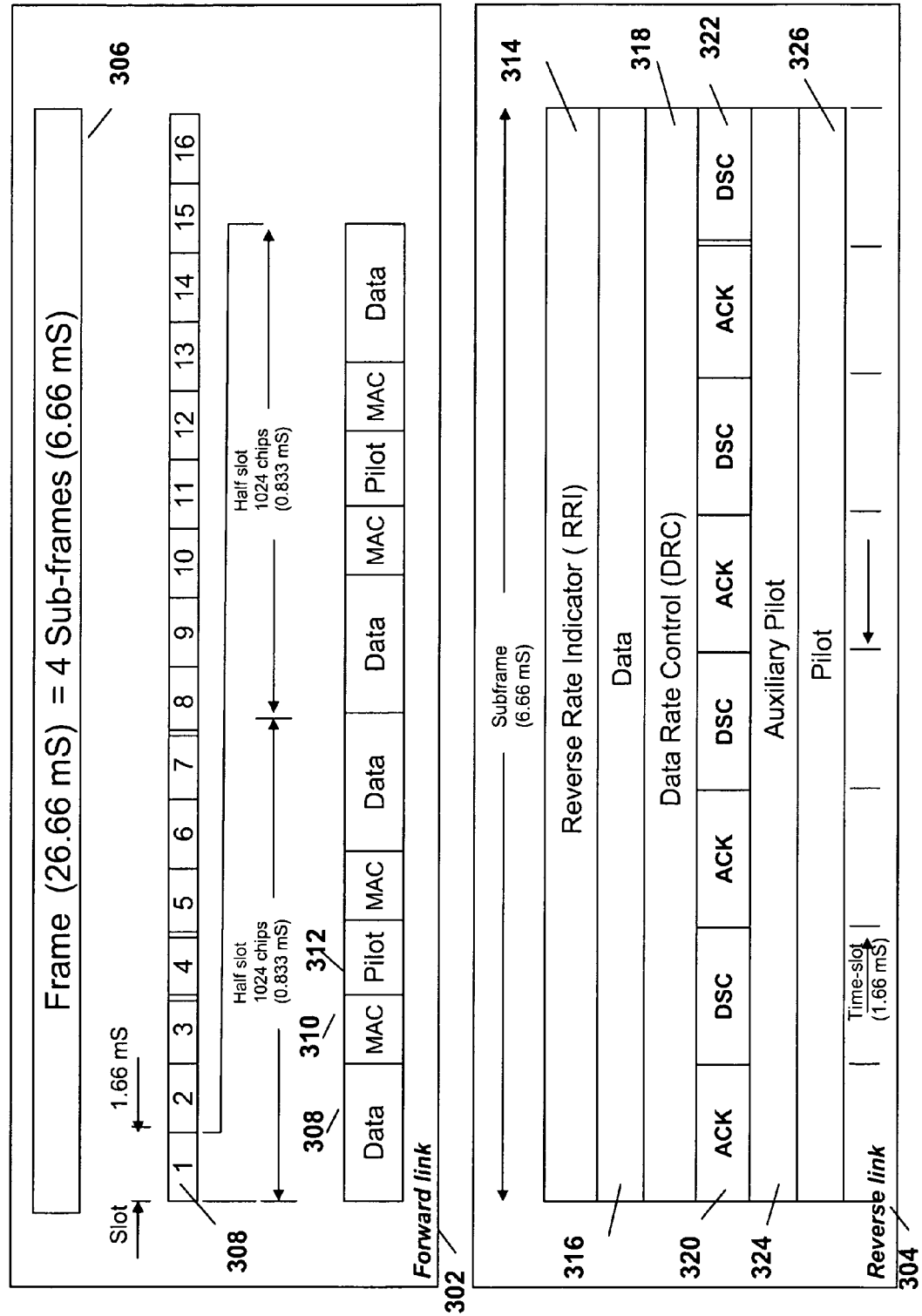
FIG. 3 illustrates the simulated forward and reverse link frame structures for the cdma2000 architecture of FIG. 2.

FIG. 3. shows the cdm2000 frame structures 300, including forward 302 and reverse 304 link frames, being simulated using the system 100 of FIG. 1 in accordance with the cdma2000 standards. Rev 0 increased the frame length 306 from the previous 20 mS in IS2000 to 26.66 mS. Frame length and structure design is critical to a system as it lays down the fundamental currency of data transmission and is the basis for the software data structures employed. Frame length is fundamental to the economics and quality of operation of a system as it defines the latencies in message transmission. A typical system will pipeline the different operations such that system latencies are minimized. Pipelining requires the use of more resources. In the forward link 302, the pilot channel 312, which is transmitted every half slot with 1024 bits, at 1.2288 Mchips per second samples the wireless channel every 0.83 mS or a rate of 1200 Hz. This provides the system with the means for fast adaptation of modulation and coding schemes to different mobile channel environments. A slot 308 occupies 1.66 mS and 16 slots make up a frame 306. As shall be described later, the simulation introduces a fixed one slot 1.66 mS transmission pipeline delay for both forward and reverse links. The forward link slots further comprise the MAC 310. There are two data blocks 308, two MAC blocks 310 and a single pilot block 312 per half slot. While the forward link 302 is code and time-division multiplexed, the reverse link 304 is largely code division multiplexed. The time-division multiplexed channels are the reverse acknowledge channels 320 used for delivering acknowledge (ACK), negative acknowledge (NAK) messages, as well as Data Source Control (DSC) 322, which indicates the desired forward link serving cell. The data payload 316, the Reverse Rate Indicator (RRI) 314 and Data Rate Control (DRC) 318 (which constitute the reverse MAC channel), the quadruple time multiplexed ACK/DSC combination 320 and 322, the auxiliary pilot 324 and the reverse pilot 326 are all code division multiplexed with various spreading factors onto the reverse link frame.

Rev 0 systems support per flow QoS on the forward link and per mobile QoS on the reverse link. A flow is defined as a source with transmission requirements associated with an application such as video-telephony, VoIP, etc. Increasing sophistication in applications has led to the demand of a system that can support a larger number of simultaneous users at acceptable latencies. In order to meet this demand, 3GPP2 has approved enhancements to Rev 0 in Rev A of the specification.

Rev A approximately doubles the reverse link spectral efficiency and doubles the number of mobiles with delay-sensitive applications that can be simultaneously supported on the system. It adds to Rev 0 a reverse link H-ARQ, higher order adaptive modulation, higher peak rate (1.8 Mbps) and finer rate quantization. Adaptive modulation controls the transmission rate based on the channel condition. H-ARQ sends additional redundancy information rather than re-transmitting an entire packet when a re-transmission is needed. On the reverse link a multi-flow MAC with QoS support is added together with a more robust interference control mechanism. The forward link peak rate is increased to 3.1 Mbps with finer rate quantization. The forward link MAC permits the access network to multicast physical layer packets and seamless adaptive server selection is made available to mobiles which report zero rate data rate control (DRC) requirements. It provides nearly 50 percent reduction in latencies during both connection set-up and while in the connected state. It offers comprehensive network control over mobile and application performance to enable the desired trade-offs between capacity and latency and fairness. It also offers coverage improvement relative to Rev 0.

Quantitatively, a 1xEV-DO Rev A network offers a forward link capacity of 1500 kbps and reverse link capacity of 500 kbps with two-way receive diversity and 1200 kbps with four-way receive diversity with 16 active users per sector using just 1.25 MHz of the spectrum. The reverse link capacity ranges from 4.8 kbps to 1.8432 Mbps with payload sizes ranging from 256 to 12,288 bits. As capacity and latency can be traded off against each other, Rev A allows the access network to set two latency targets for each payload size for a mobile. The latency target is defined by one of two transmission modes, low latency (LoLat) and high capacity (HiCap). The LoLat mode requires a larger traffic to pilot (T2P) ratio, a system resource, to achieve the same error performance as a higher latency mode. Packets transmitted in LoLat mode are accordingly power-boosted to ensure termination within the latency target. T2P control is used for the reverse link in Rev A in preference to rate control as in Rev 0 and this is embodied in the simulator.

Figure 4:
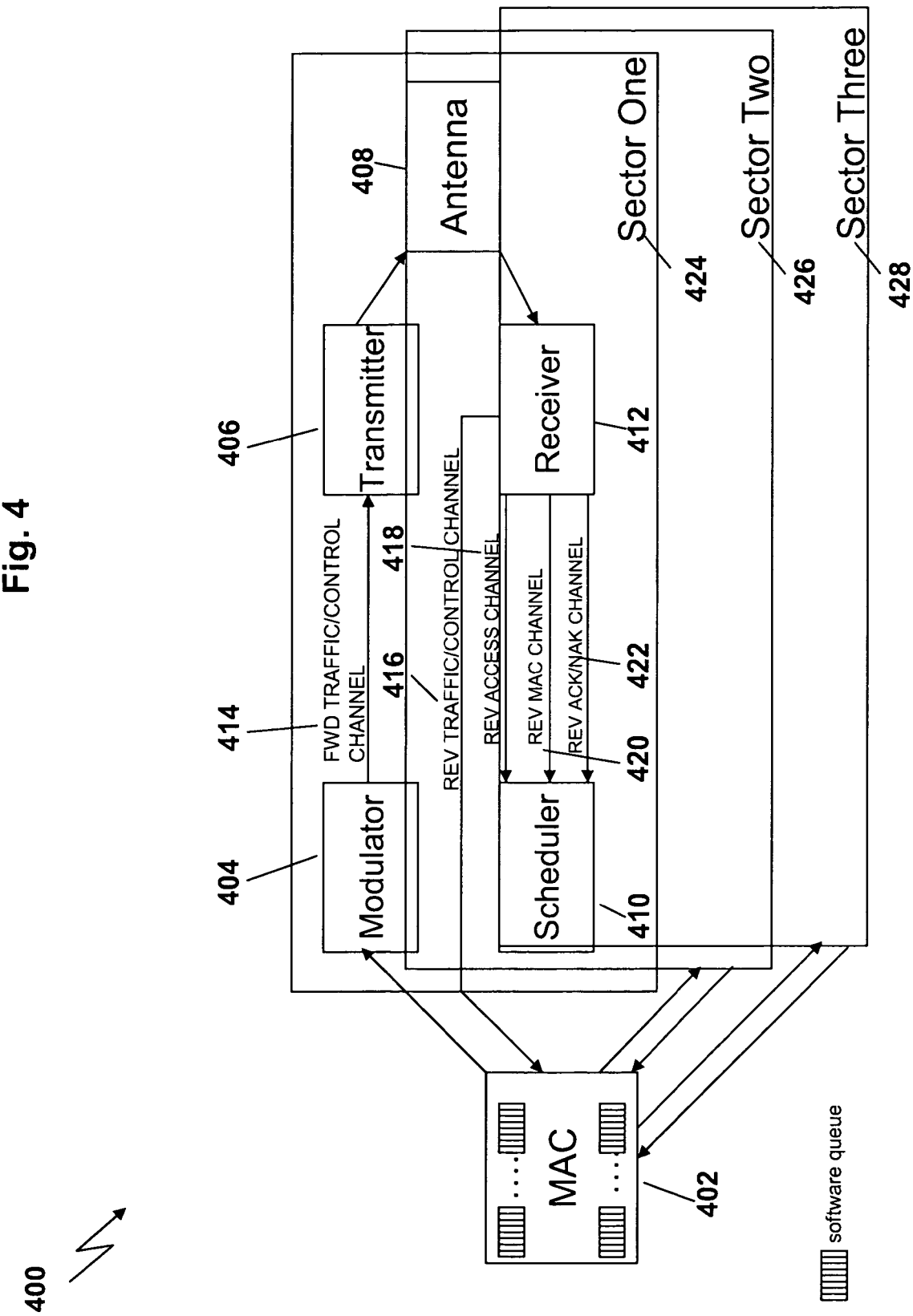
FIG. 4 illustrates one embodiment a base station simulation module.

FIG. 4 illustrates one embodiment of a base station module 400 of the invention simulating the functionality of BS 222 of FIG. 2. This shows all sectors 424, 426 and 428 of a three-sectored cell. Sector One 424 is herewith described. Sector Two 426 and Sector Three 428 are identical. Each sector comprises a modulator 404 which communicates with the transmitter 406 via a Forward Traffic/Control Channel 414. The modulator 404 receives segmented/encapsulated PHY packets from the MAC processor 402 and transmits them to the Transmitter 406. It also keeps local copies of the transmitted packets in the event of an eventual need to re-transmit packages. An innovation to support H-ARQ entails the inclusion of adaptive modulation and H-ARQ information inside the packet in order to avoid, if possible, re-sending the entire package. The pipeline stages have been modified accordingly. The channel 414 is mainly used for delivering forward traffic data to the MSs (e.g. MS 202). Each traffic packet consists of data, MAC and pilot components. It is also used to deliver control messages in a time-shared fashion. The transmitter 406 connects to the antenna 408 which transmits and also receives radio frequency signals. The antenna 408 connects to the receiver 412 which demodulates the reverse (time division and code division multiplexed) signals. These are namely the reverse acknowledge channel 422 used for delivering acknowledge (ACK) and negative acknowledge (NAK) messages and is also used for Data Source Control (DSC), the reverse MAC channel 420 for updating DRC (dynamic rate control) requests, the reverse access channel 418 used for setting up connections and receiving MS status messages, and most importantly the reverse traffic and control channel 416 used for delivering reverse link traffic. It is also used to deliver upper layer control and acknowledgement messages. Messages 418, 420 and 422 are bound for the scheduler 410 while the reverse traffic channel 416 heads directly to the MAC module 402. In this embodiment, the scheduler 410 assigns forward link time slots based on the DRC feedbacks and the selected scheduling algorithm. The scheduler 410 is also responsible for handling re-transmission requests from the mobiles.

In this embodiment, the MAC Processor block 402 comprises multiple queue mechanisms and segmentation buffers. It keeps separate queues for each individual MS served by the Base Station 400's three sectors 424, 426 and 428. It also assigns a segmentation buffer for each MS in order to support variable packet sizes. In subsequent developments, the Base Station 400 will need to keep up to 16 separate queues for each MS in order to manage multiple traffic flows and Quality of Service (QoS) requirements. The MAC 402 keeps track of each queue, updating the back-logged data status. The MAC 402 informs the scheduler 410 each time there is a change in state in a queue (from empty to non-empty and vice-versa) via a remote interrupt so that the scheduler 410 can make the appropriate scheduling decisions. The remote interrupt code is used to identify which mobile station's backlog condition is being reported. When a new packet arrives from a BSC (e.g. BSC 234), the MAC 402 places the packet in the destination address of the mobile's outgoing queue. If the mobile's prior backlogged status is empty, it generates a remote interrupt to the scheduler 410 indicating a non-empty queue and that data needs to be scheduled for transmission. When an interrupt from the scheduler 410 arrives informing the MAC 402 of which mobile is to transmit and at the DRC level (indicated by the interrupt code), the MAC 402 segments and encapsulates a DRC-specified packet to send to the modulator 404. After sending out the segmented packet, it checks to mobile's back-logged status generating a remote interrupt to the scheduler 410 if its queue is empty. When a scheduler control interrupt arrives, this being identified through the interrupt code, the MAC 402 creates a control packet according to the requested type of transmission (multicast or unicast) and sends it to the appropriate sector modulator. In the event of hand-off of a mobile to another base station, the scheduler block 410 triggers a MAC queue transfer. Upon receiving a queue transfer request via remote interrupt, the MAC 402 forwards the relevant queue to the Base Station Controller module (system architecture as illustrated in FIG. 2) so that it can direct the data to the new Base Station that the mobile has migrated to.

The simulation platform described is capable of integrating a plurality of schedulers, a feature of value as scheduling algorithms are becoming increasingly context-specific and have a large influence on behaviour and performance of a multi-processing system as the system under discussion. In this particular embodiment, the scheduler block 410 executes a multi-user diversity (MUD) scheduling algorithm which utilizes the natural characteristic of a fading channel in practical wireless systems to maximize throughput. The performance of multi-user CDMA systems in general is greatly affected by individual channel fluctuations or channel fading between the user and the base station. In a large system with a large number of independently fading users, there is at any time at least one strong user to whom resources can be allocated. This scheduling algorithm exploits the inherent multi-user diversity while maintaining fairness among users by tracking the instantaneous channel quality of the users and by scheduling transmissions to the user who has the best channel quality at any given time. The system thus rides the peaks in channel qualities of all users at all times. The inclusion of this algorithm and its customization for the Rev. A forward link is regarded as an advancement to prior art.

In this embodiment, the scheduler 410 has a principal function of updating and keeping track of each mobile's current state (active, sleep or inactive) as a pre-requisite for performing the scheduling function in its associated serving sector. In order to perform this, the scheduler 410 needs to be informed of the status of each mobile queue. When the simulation begins, the scheduler 410 broadcasts a register control message to invite all mobiles to establish connection. All mobiles that reply with access acknowledgements are registered and the scheduler block transitions from an initialisation state to an idle state.

In the implementation of the open/closed loop rate control feature, a periodic data rate control (DRC) message is sent to the base station by all mobiles and this message contains a requested data rate as well as a transmitting sector indication. The scheduler 410 maintains a DRC table and updates it each time an interrupt is received. The transmitting rate sector chosen by the mobile is the one that provides the best forward link channel and can receive the a priori forward link channel state information (CSI) with acceptable reliability. If an ACK 422 arrives from a mobile, then the scheduler 410 resets the modulator 404. If a NAK 422 arrives the scheduler 410 checks the current re-transmission count and if the count is exceeded, the modulator 404 is re-set else the scheduler 410 increments the re-transmission count and schedules a re-transmission. When scheduling a transmission, the new transmission event existing for the time slot is cancelled and re-scheduled for the next time slot. If the re-transmission timer expires (the scheduler 410 keeps track of four separate re-transmission timers), the scheduler 410 checks the current count and if this exceeds the maximum number of time slots, it re-sets the modulator 404 else it increments the counter and schedules a re-transmit event. Receiving no acknowledgement from a mobile is treated the same as receiving a NAK. Again, when scheduling a transmission, the new transmission event existing for the time slot is cancelled and re-scheduled for the next time slot. Each time the scheduler 410 is interrupted by the MAC channel 420, it toggles the corresponding source mobile's status between active from idle. In the event that all mobiles have empty queues and the scheduler 410 has nothing to send, the scheduler 410 nonetheless triggers the modulator block 404 to send out pilot and empty packets in the forward link channel 414. The scheduler 410 also periodically sends out control messages using the forward channel 414. However, no new or re-transmission event is scheduled during a paging/control period.

The strategy employed when an inter-cell hand-off request arrives from a mobile is now described. The scheduler 410 informs the BSC (e.g. BSC 234) of the request but continues to schedule the mobile until it receives the queue transfer reply back from the BSC, but continues to schedule the mobile until it receives a reply back from the BSC to transfer the queue. On receiving such reply, the scheduler 410 de-registers the mobile from its active list and requests the MAC block to forward any remaining buffers belonging to the transferring mobile to the BSC. When an inter-sector hand-off request arrives from a hand-off mobile, the current scheduler informs the new sector scheduler of the hand-off located within jurisdiction of the same base station and de-registers the mobile from its active list. The new scheduler registers the mobile in its active list and starts scheduling it if its buffer is not empty. The local MAC block 402 is responsible for forwarding packets correctly and the BSC is not involved in inter-sector hand-offs.

In this embodiment of the Base Station 400, the modulator block 404 is required to address re-transmissions across 4 slot spans and therefore is required to track events across four separate but concurrent transmissions. A good way to embody this requirement is to use the facility of "child" processes used in some generic simulation engines. The modulator process 404 creates a child process each time it receives an encapsulated PHY packet from the MAC process 402. This child process then manages initial transmission and subsequent re-transmission attempts for the PHY packet. The child process can be destroyed by the modulator process 404 when triggered by the scheduler 410. A child process can be initiated for a data packet, a control packet, or an empty packet transmission, in the case of the latter, the pilot and MAC are still transmitted. The modulator process 404 creates a child process to handle a newly arrived packet's initial transmission or re-transmission. When the scheduler 410 interrupts the modulator 404 for re-transmission, the root process passes the interrupt to the appropriate child process. The child process re-transmits the local copy of the original packet. When the scheduler 410 re-sets the modulator 404, the root process terminates the child process.

Figure 5:
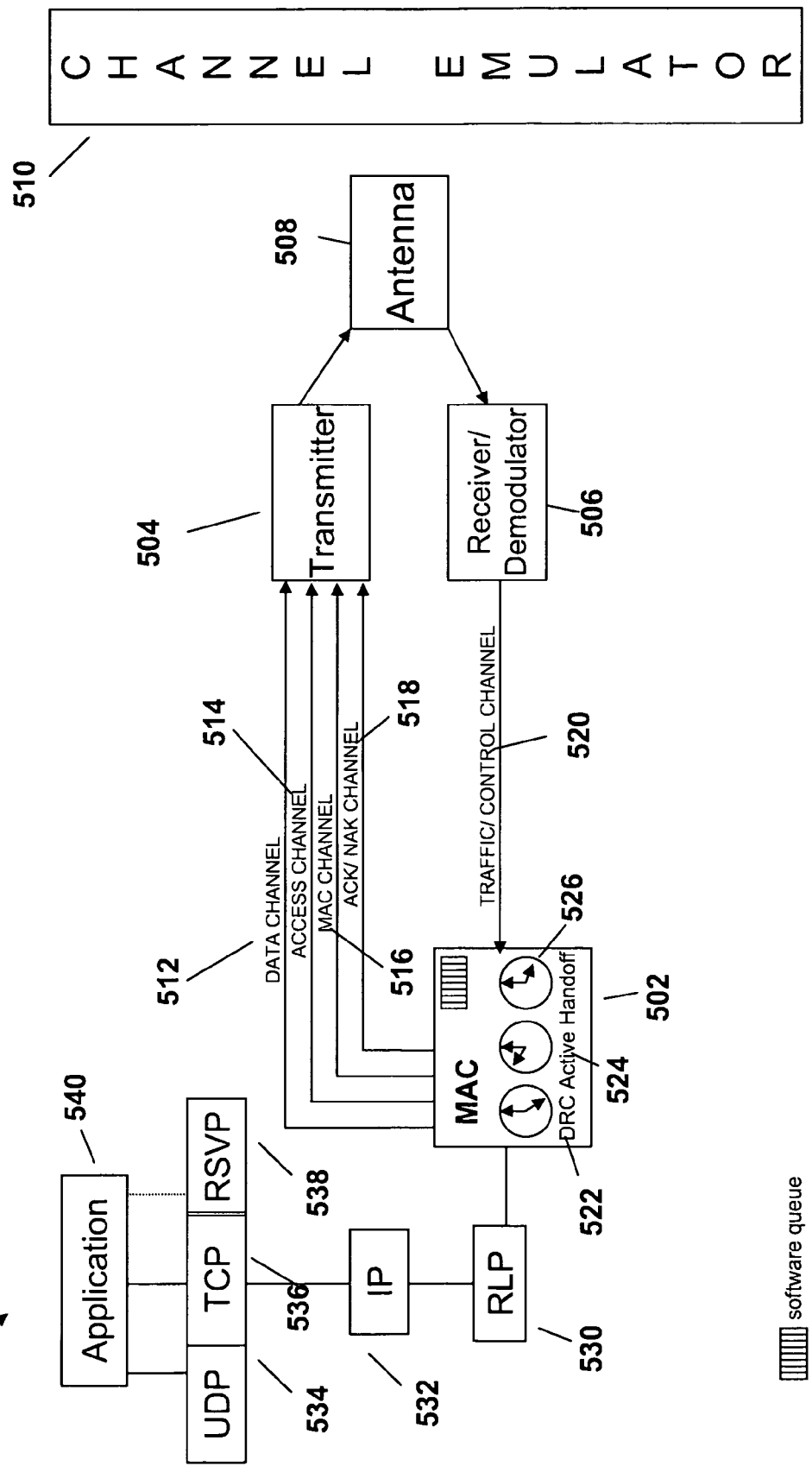
FIG. 5 illustrates one embodiment of a mobile station simulation module.
Figure 6:
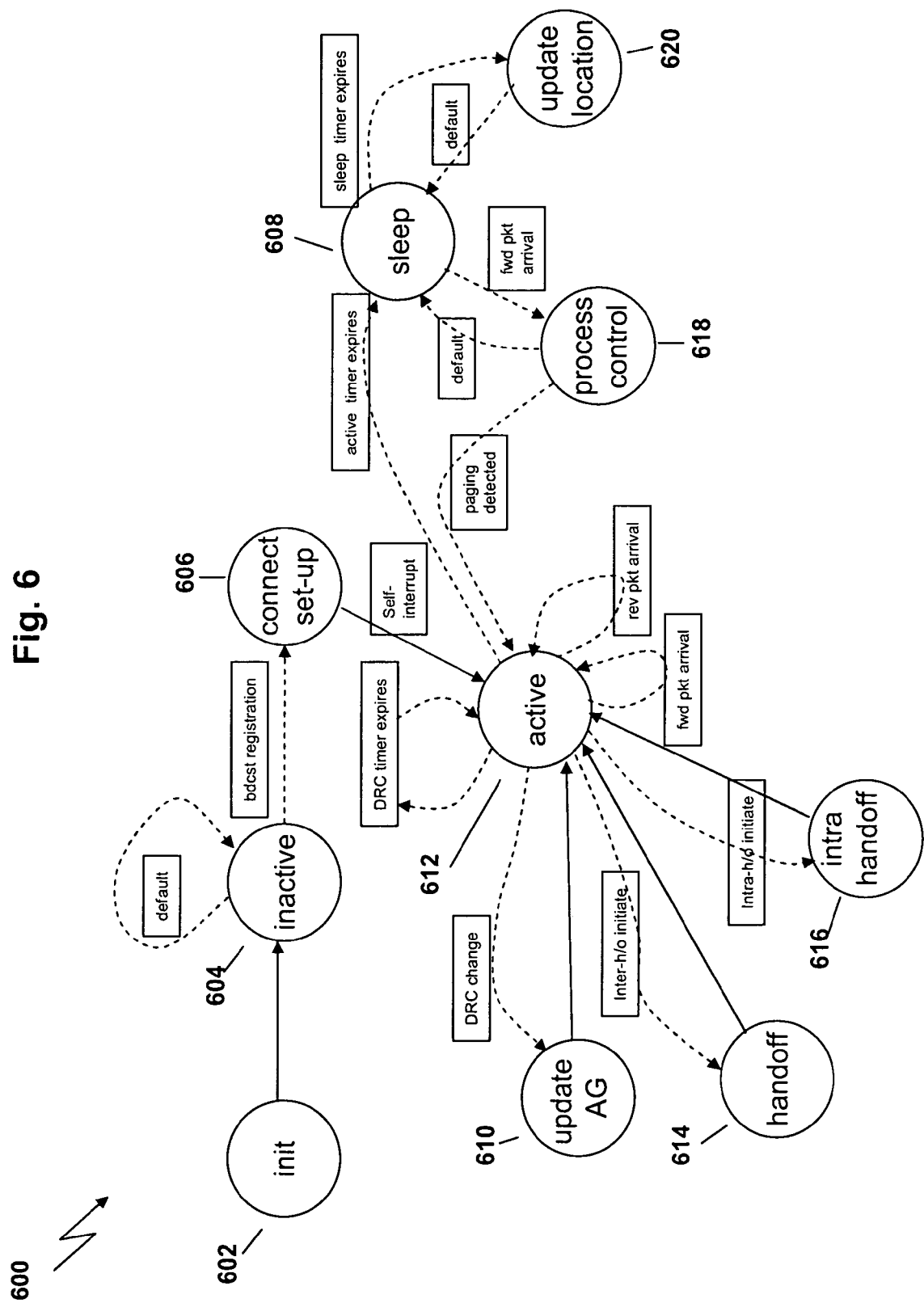
FIG. 6 illustrates the simulation state transition diagram for a mobile station's MAC.

FIG. 5 illustrates one embodiment of a mobile station module 500 of the invention simulating the functionality of MS 202 of FIG. 2, while FIG. 6 illustrates the mobile station's 500 MAC state transition diagrams.

Referring first to FIG. 5, the MAC processor block 502 feeds the forward link data and signalling to Transmitter 504 via the data channel 512, the access channel 514 as well as DRC requests 516 and ACK/NAK acknowledgements 518. In the case of incoming data, it also encapsulates and re-assembles traffic packets to pass them to the Radio Link Protocol layer (RLP) 530 from which the data undergoes Internet Protocol de-packetization operations at the IP layer 532 and then proceeds to the User Datagram Protocol (UDP) 534, the popular Transmission Control Protocol (TCP) 536 or the newer Reservation Protocol (RSVP) 538 which supports QoS streams or flows. These operations correspond to the transport layer (Layer 4) of the OSI reference model. Data and any residual signalling information are eventually passed over to the application layer. The Transmitter block 504 and receiver/demodulator block 506 support reverse and forward link channelizations respectively, each interfacing with the antenna block 508. Code division multiplexing is employed for the reverse link. These connect in the simulation model to the wireless channel pipeline 510 in which options can be chosen to model various and varying wireless channel conditions between the mobile and base station for the wireless transmission. The wireless channel pipeline stages co-operatively receive modulated PHY packets and demodulate them by calculating effective $E_b/N_o$, an important system parameter for all digital communication cellular systems, and coding rate. The wireless channel pipeline determines if the current received packet is error-free or in error and passes this information to the MAC block 502. It also generates the pilot estimations for the MAC block 502 to issue DRC requests which are contained within the MAC channel 516. In this embodiment, a generic wireless channel pipeline may be modified and optimized for the cdma2000 application. It should, however, be noted that the wireless channel may itself be substituted for newer and better models. The ability to utilize a plurality of wireless channels is important to the continuing growth of the simulation platform.

In this embodiment of Mobile Station 500, the MAC model is the pivot point in the simulation and the specification and implementation of the mobile MAC may be critical to the performance of a digital cellular system. The mobile may be viewed as a state machine whose behavior is controlled by the access network via the base station. A requirement of EV-DO, for hand-off purposes, is that the mobile needs to monitor signals from multiple base stations, called the 'active set' and not just the base stations it is in communication with.

The MS MAC processor state transition diagram depicted in FIG. 6 illustrates all states 600 of the MAC, its four principal states of interest being the inactive state 604, connection set-up state 606, sleep state 608 and active state 612. After initialization 602, a broadcast registration message triggers a transition from the inactive 604 state to connection set-up stage 606. A self-interrupt with an arbitrary delay value makes the MAC transition to active state 612. In the active state 612, the mobile is capable of receiving traffic packets from the base station sector it is connected to. It manages two separate timers, the DRC timer 522 and an active timer 524 of FIG. 5. The DRC timer 522 determines how often the DRC index is reported to the base station and the active timer 524 counts up the duration of each idle period (no traffic arriving from the base station). On time-out of the active timer 524, the MAC transitions to the sleep state 608 of FIG. 6. The mobile is prevented from receiving forward traffic packets from the base station, such packets arriving being forwarded to a simulation process control entity 618 in FIG. 6. A sleep timer (not shown) allows the mobile to transit to update location state 620 before returning to sleep state 608. A change in DRC causes the MAC to transition to state 610 to update address generators. The mobile transitions back to the active state 612 on arrival of an interrupt via a packet stream from the receiver/demodulator 506 of FIG. 5. Forward and reverse time slot boundaries are skewed by half a slot (0.833 mS). While in the active state, the mobile can listen to and demodulate forward traffic packets. When a PHY packet arrives from the receiver/demodulator 506, in FIG. 5 and is deemed to be free of errors, the MAC re-assembles the segmented MAC packet and passes it towards the application layer 540 of FIG. 5 by way of the intermediate layers. It then sends an ACK packet on channel 518 to the base station and resets its active timer 524. When a faulty PHY packet arrives from the receiver/demodulator 506 via the reverse Traffic/Control channel 520, the MAC discards the packet but nonetheless reads the pilot information, thus maintaining channel sampling every 0.83 mS or at 1200 kHz, which is a system requirement. The MAC 502 also sends a NAK package on NAK channel 518 and resets active timer 524. When the DRC timer 522 times out, the MAC 502 reads the most recent pilot estimate which is stored in the receiver/demodulator 506 and sends the corresponding DRC index via a DRC quiet stream update to the base station via a DRC packet. When the active timer 524 times out, the receiver group is updated and the sleep timer (not shown) is initialized. When the sleep timer times out and if no control packet is present, the sleep timer is re-set again. If a control packet is present, the receiver group is updated and the sleep timer stopped. The lowest (most reliable) DRC index is then sent to the base station to inform it that the mobile is now active.

The MAC 502 also triggers both inter-cell and intra-cell handoffs when it detects pilot signals stronger than the current serving sector's pilot strength. A level of hysteresis is built into the process to prevent false or temporary changes in pilot signal strength from causing handoffs. The condition that triggers a handoff timer 526 must stay true until a preset duration, otherwise the timer 526 either gets reset by another handoff condition or cancelled altogether. If the timer 526 times out successfully the MAC 502 informs the mobile's current sector to initiate the handoff procedure and transitions to handoff state 614 or intra handoff state 616 of FIG. 6 as the case may be.

Figure 7:
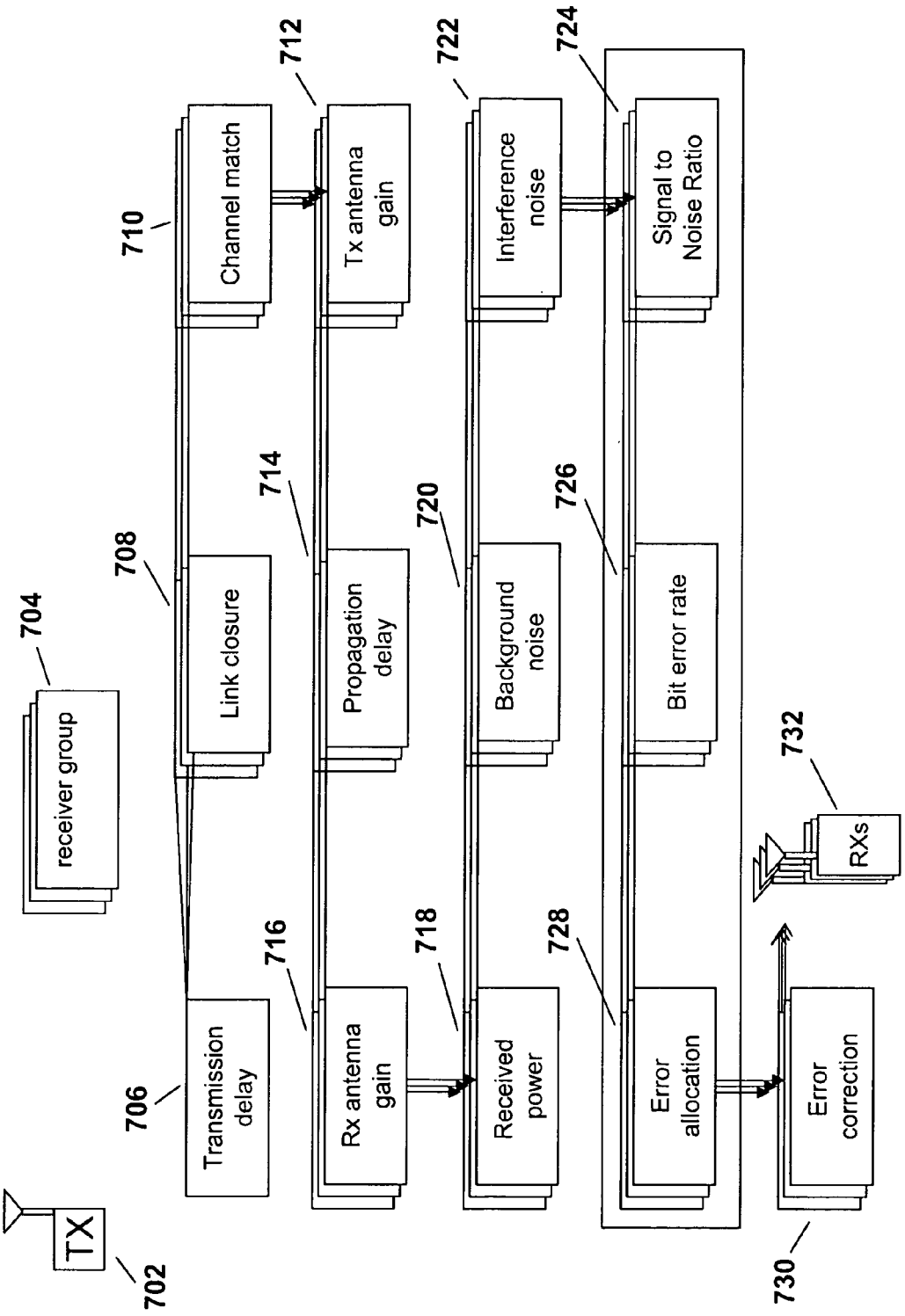
FIG. 7 illustrates one embodiment of a channel emulator using a generic simulation engine.

The wireless channel depicted in channel emulator 214 of FIG. 2 presents a difficult challenge to wireless simulation networks, as it is difficult to model the time and season-variant air interface. In this embodiment of the system simulation, the wireless channel between base station and mobile may be modelled using a generic Radio Transceiver Pipeline simulation library that is commercially available, but which has been modified and improved to represent the wireless transmission of packets in the Rev. A specification for both forward and reverse links. Modelling of the wireless channel demands highly precise and wide range mathematical operations of the host computing system and languages that have the suitable constructs. This embodiment utilizes (and modifies) the a fourteen-stage simulation process pipeline as detailed in system 700 of FIG. 7. In one embodiment, the receiver group module 704 creates an initial receiver group for each transmitted channel and runs once for each transmit-receiver channel, establishing the set of receiver channels allowed to communicate with a particular transmitter 702. It may be executed once at the start of simulation for each transmitter-receiver pair in order to determine the feasibility of communication and is not executed on a per transmission basis.

In one embodiment, the transmission delay module 706 calculates the time for the entire packet transmission at the transmitter 702 and is executed once for each packet transmitted. It may be set at a fixed one slot 1.66 mS delay for both forward and reverse links. From hereon, modules 708 to 730 inclusive may be executed once for each receiver. Module 722, simulating interference noise, can be run zero or more times. Modules for signal to noise ration 724, bit error rate 726 and error allocation 730 may be executed more than one time for statistical calculations.

The link closure module 708, which may be executed immediately after the transmission delay module 706, determines whether a receiver channel can be affected by a transmission. In one embodiment, it runs once for each packet from the transmitter 702 and for each transmitter-receiver channel to determine if communication is possible, checking if a receiver channel is impacted or impaired by the transmission or any interfering transmission.

The channel match module 710, which may be executed immediately after the link closure module 708 classifies the transmission with respect to the receiver. If the transmission impacts the receiver channel (passes the previous link closure stage 708) then it may be classified as ignored, noise (interference) or valid (desired signal). For the forward link, the existing code attribute for the packet may be used as the scrambling code. Channels with different code attributes may interfere with each other. For the reverse link, the existing code attribute is used for code spreading and additional code attributes are created to specify scrambling codes according to one embodiment. Channels with the same scrambling codes but different spreading codes may be considered to be completely orthogonal.

The transmitter antenna module 712, which executes immediately after the channel match module 710, computes the associated antenna gain. It is executed separately for each valid destination or for noise channels to compute the transmitter antenna gain based on the direction of arrival of the signal at the receiver from the transmitter.

The propagation delay module 714, which may be executed immediately after the transmitter antenna module 712, calculates the time for a packet to arrive at the receiver from the transmitter. In one embodiment, it is invoked once for each packet transmitted and each receiver channel passing the link closure stage 708 and the channel match stage 710. The overall delay of the packet is therefore the sum of the delays calculated from the transmission delay stage 706 and this propagation delay module 714. The propagation delay may be calculated from the following formula:

$$d_{prop} = r/c$$

where r is the distance between the transmitter and receiver and c is the speed of light.

The receiver antenna gain module 716, which may be executed immediately after the propagation delay module 714, computes the associated receiver gain based on the vector leading from the receiver to the transmitter. In one embodiment, it is the earliest stage in the receiver and is executed separately for each packet and each eligible destination channel.

The received power module 718, which may be executed immediately after the receiver antenna gain module 716, computes the received power of the arriving packet in watts. In one embodiment, it is executed once for each packet and each eligible destination channel. The received power $P_{Rx}$ may be calculated from the following formula:

$$P_{Rx} = P_{Tx} \cdot G_{Tx} \cdot G_{Rx} \cdot S \cdot \left[ \frac{c^2}{16\pi^2 r^2 f^2} \right] \cdot \alpha$$

where $P_{Tx}$ is the transmitted power, $G_{Tx}$ the transmit antenna gain, $G_{Rx}$ the receive antenna gain, S the shadowing effect, $\alpha$ the fading component, c the velocity of light, f the transmission frequency and r is the distance between the transmitter and receiver. The expression $$\left[ \frac{c^2}{16\pi^2 r^2 f^2} \right]$$

represents the path loss through the wireless medium.

Various different types of path loss between the transmitter and receiver due to fading can be experienced. For example, a flat fading channel imposes the same fading over the entire used channel bandwidth and is normally used for a single path channel. For a multi-path channel, which is often the case, each path between transmitter and receiver imposes a different fading according to a delay profile and amplitudes are computed using a Rayleigh distribution.

A commercially available wave propagation model, the COST-HATA model, which can be used for transmission frequencies up to 2 GHz, may be conjoined to the simulation for both forward and reverse paths. This models the delay spread, angular spread and impulse response of the channel and covers a range of macro-, micro- and pico-cells including indoor scenarios and outdoor environments such as tunnels and highways. Other models embodying time-dispersive channel characteristics: dynamic path loss, shadowing and fading may also be suitable for modelling at the cdma 2000 frequency bands. For the forward link, Radio Signal Strength Indicator (RSSI) monitoring of the pilot signal of the active set of base stations has been added. For the reverse link, modifications comprise accurate total power calculation and support for soft handoff. As the simulation must be valid for mobiles in moving vehicles and a mobile's movement (Doppler) affects the condition of the channel for both flat and non-flat fading situations, a feature may be added where the fading condition of the channel for each wireless link is correctly updated based on the mobile's vehicular speed.

The background noise module 720, which may be executed immediately after the receiver power module 718, represents the effect of all noise sources except interferences measured at the receiver's location and in the receiver channel band. In one embodiment, it is executed once per packet and per each receiver channel. These sources may include thermal noise, emissions from neighboring electronics, and otherwise unmodelled radio transmissions.

The interference noise module 722, which may be executed immediately after the background noise module 720, accounts for the situation in which two packets arrive concurrently at the same receiver channel and its purpose is to calculate the interference effect of one packet on others. In one embodiment, it is executed for valid packets arriving at the receiver at the same channel concurrently with another packet. This module may be executed for one packet and for one channel several times depending on how many packets are received at the receiver.

The signal-to-noise ratio (SNR) module 724, which may be executed immediately after the interference noise module 722, computes the average SNR for the packet. The SNR may be used to determine if the packets have been received appropriately or not, and whether the transmission is invoked or not. The module may be executed when a valid packet arrives or when a collection of packets have arrived. This module may be executed for a single packet and for a single receiver channel several times depending on the number of packets which have arrived at the receiver. The purpose is to compute the current average power SNR result for the arriving packet(s) and is based on values obtained during earlier stages, including the received power module 718, background noise 720 and interference 722. Modifications may be made to the commercially available model so that the SNR being reported is that of the entire packet and not a segment of a packet. The default way of measuring SNR in some general simulators is to segment each packet into parts that experience different SNRs due to changes in the noise and interference environment. In one embodiment, this aspect of may be simplified so that only a single (average) SNR value is reported per packet.

The bit error rate (BER) module 726, which may be executed immediately after the SNR module 724, derives the probability of bit errors. And the value may depend on the type of modulation used for the transmission as well as the SNR of the received packet. In one embodiment, it is executed for a valid packet either received completely, or being received when other packets arrive, or on completion of reception. In one embodiment, the objective is to derive the probability of bit errors during the past interval during which the SNR has been constant.

The error allocation module 728, which may be executed immediately after the BER module 726, estimates the number of bit errors in a packet segment where the bit error probability has been calculated and is constant. This segment could be the entire packet if no changes occur in bit error probability over the course of the reception of a packet. The bit error count estimation is usually based on the bit error probability and the length of the affected segment.

The error correction module 730 may determine whether or not the arriving packet can be accepted for higher level processing. In one embodiment, it is executed when a packet completes reception and immediately after the error allocation module 728. Acceptance of a packet may be dependent on whether the packet has experienced collisions, the result computed in the error allocation module 728, and the ability of the receivers 732 to correct the errors found within the packet. Based on the result of this determination, the module 730 will either destroy the packet and request for a re-transmission, or allow the packet to continue for further processing at the higher layers. This result affects error and throughput results collected for the receiver channel.

As stated previously, the Rev. A simulation package developed has two major operational components—one for the forward link and one for the reverse link. Some of the main improvements are implemented in this embodiment of the system simulation of the reverse link. These include the implementation of closed-loop power control with inner and outer loop, soft/softer handoffs, reverse link Hybrid ARQ, closed loop rise over thermal (RoT) control and multiple branch receiver antenna diversity with maximal ratio combining. The rise over thermal is an important system operational indicator and is defined as the ratio between the total power received from wireless sources at a base station and the thermal noise. System operation at high RoT may lead to power control instability in CDMA systems as small changes in load at high operating points result in large variations. System stability is improved by reducing the delay in the RoT control loop. This is achieved in Rev A by the use of a reverse activity bit (RAB), which is updated once every slot (1.66 mS) in Rev A instead of every frame (26.66 mS) in Rev 0. This embodiment of the simulator assumes dual diversity antennae at the BS.

Figure 8:
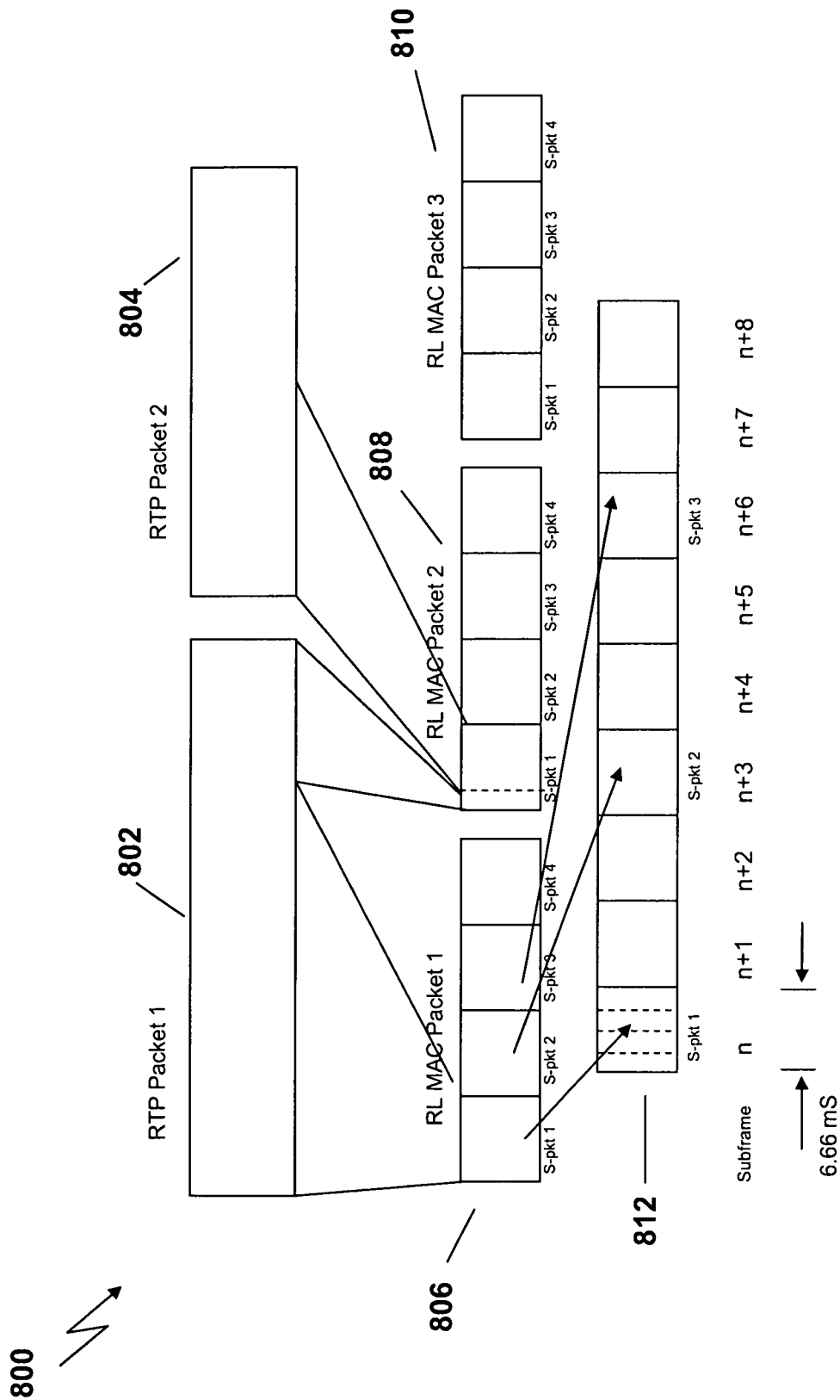
FIG. 8 illustrates the interlacing structure for RTP packets in the reverse link.

This embodiment of the system simulation includes the Rev. A reverse link traffic channel MAC (RTCMAC) Subtype 3 which is capable of supporting 16 separate traffic flows per mobile while maintaining a level of QoS differentiation between them. RTCMAC supports both LoLat and HiCap modes. Each traffic flow gets assigned access based on a token bucket resource allocator in which the inflow of tokens can be varied depending on system status. This method of access control can handle the bursty traffic typical of multimedia applications while still regulating the overall assignment of resources in the system such as the traffic to pilot ratio (T2P). RTCMAC also has built control for capacity/fairness/interference control to reduce transmit power when a mobile approaches cell boundaries. The simulator has been used to evaluate the impact on the HiCap data services due to the introduction of real-time traffic, a reduction of 25% in data throughput. Some modifications have been made in the corresponding forward link MAC control module to support some of the reverse link features such as power control and H-ARQ. The various reverse link channels are code-division multiplexed as previously illustrated in FIG. 3 with distinct gains with respect to the pilot channel. Data traffic packets are transmitted per sub-frame of 6.66 mS which consists of four time-slots. The reverse link supports 12 different traffic payload sizes whose effective transmission rates depend on the particular transmission termination points. By way of examples, the reverse link traffic channel packet sequencing 800 illustrated in FIG. 8 can support up to 3 separate simultaneous transmissions by interlacing packets in 3 sub-frame intervals. Two RTP packets 802 and 804 are shown being partitioned over three MAC packets 806, 808 and 810. The data are packed in successive subframes 812.

In this embodiment of the system simulation reverse link power control, the BS issues power control commands once every 4 time-slots or sub-frame (6.66 mS) over the forward link. It then compares the averaged pilot channel SNR with the current target value and issues power-up/down commands accordingly. Power control commands issued at a slot take effect in time one slot later. An outer loop also exists to control the target pilot channel value.

Figure 9:
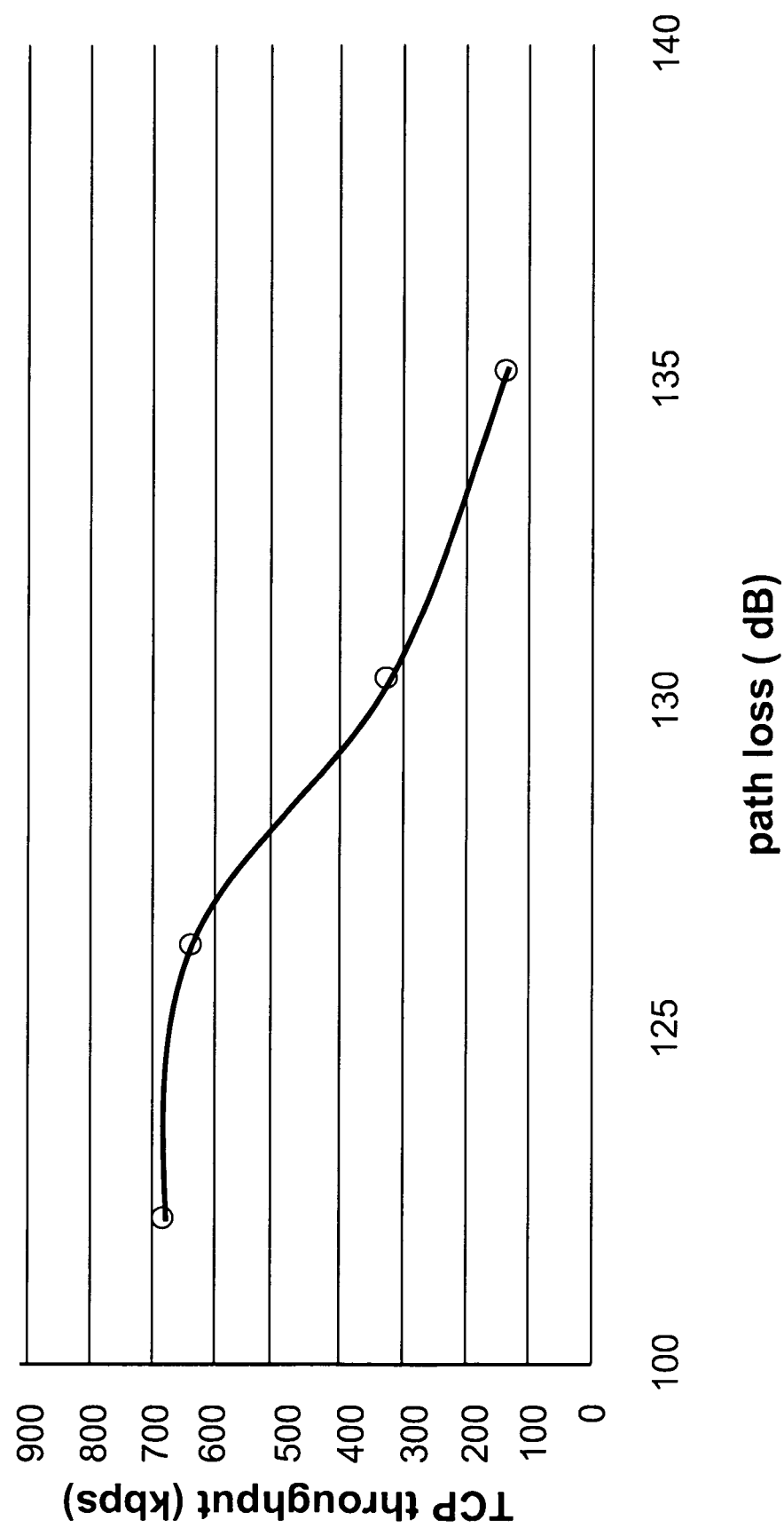
FIG. 9 illustrates one embodiment of a simulation result.

In one embodiment, the simulator can mimic several error conditions to evaluate the performance of the reverse link power control algorithms and implementations and plot performance curves. This may be important for system planners in order to assess the throughput bit rates achievable given different path loss conditions. FIG. 9 illustrates one such result wherein the overall throughput bit rate measured at the TCP packet reception rate is plotted against path loss in the channel. For this particular simulation illustrated, for the case of a single mobile, a 5 dB rise over thermal (RoT) threshold was set. TCP/IP/PPP control overhead was subtracted from the simulation MAC throughput so the results depict actual data rates achieved.

This embodiment of the system simulation includes soft and softer hand-off. Hand-off is an essential component in mobile cellular systems as moving around causes dynamic variations in link quality and interference levels, sometimes requiring that the mobile change its serving base station (soft handoff) or its sector within a base station (softer handoff). Softer handoff thus entails just the serving base station. As opposed to hard handoff used in analog cellular telephony, where a definite decision is made whether to handoff to a new entity or not, in soft and softer handoff a conditional decision is made and the handoff is executed similar to the way a relay runner hands over the baton to the new runner. Since serving entities for the forward link and reverse link can be different during the handoff, complications can arise for example when the ACK or DRC channel cannot be decoded by the serving forward link entity. Mechanisms are included in the simulator to get over this difficulty, viz., the use of the DRC lock channel to indicate to the mobile how reliable the reception at the network is.

By way of background, PTT is a simplex or half-duplex form of communications that requires the person speaking to press a button while talking and release when finished. The listener then presses a PTT button to respond. This simplex or half duplex access method allows the system to easily discern which direction the signal should be travelling and consumes less system resources than a normal cellular call. Communication is quick and spontaneous, without the caller having to go through a typical dialing and ringing sequence. Communication in this type of service is generally very short, with individual talk spurts being generally of the order of seconds. It is particularly suitable to enterprise markets where communication exchanges tend to be short rather than conversational. PTT mobile and server software allow users to connect instantly with other PTT users anywhere in the world in single-cast or multicast mode with the push of a button rather than through completion of a normal cellular call. A call is formed by combining separate point to point connections between each Internet Protocol (IP) endpoint at a PTT Server.

Figure 10:
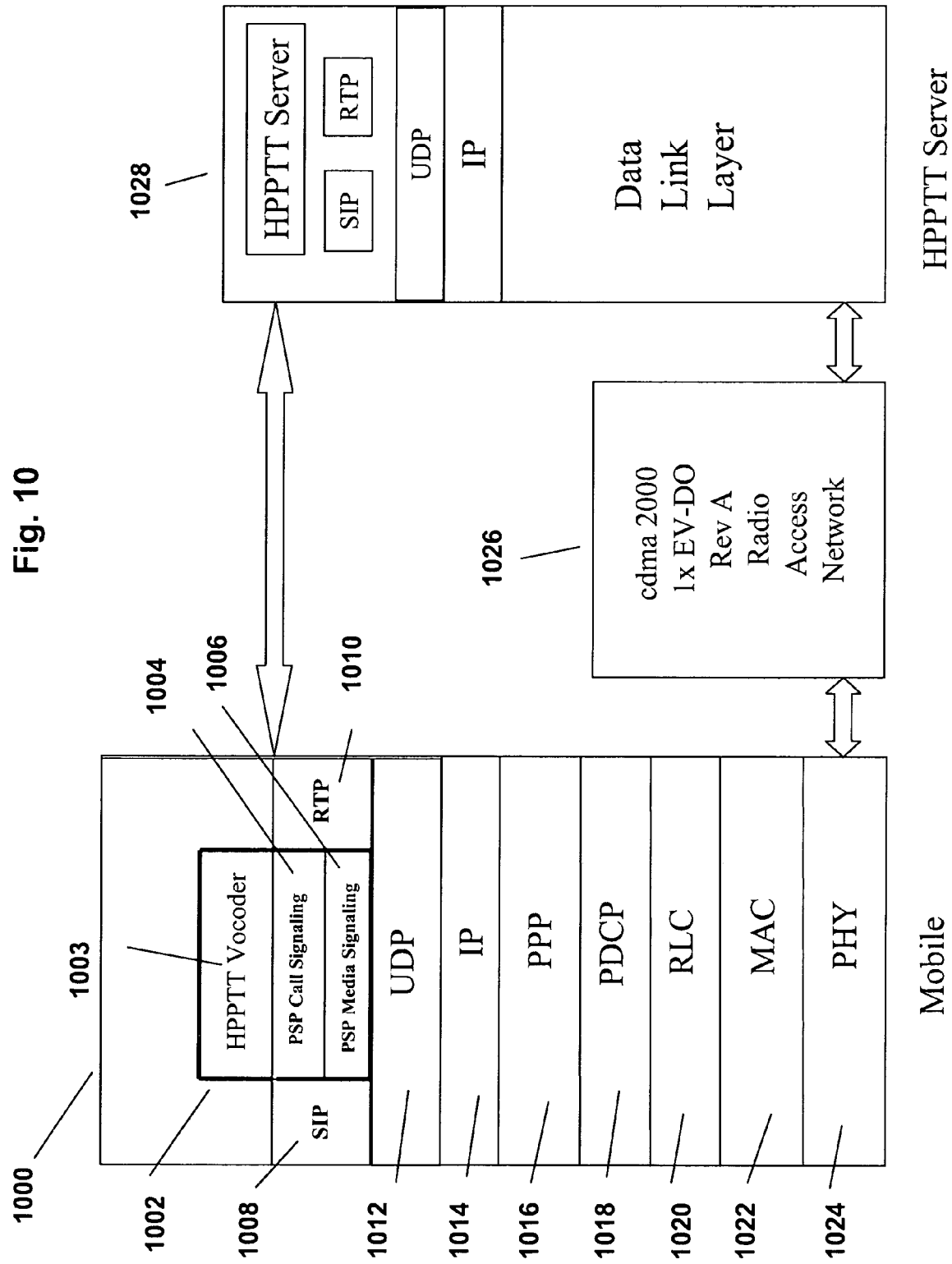
FIG. 10 illustrates an HPPTT simulation architecture.
Figure 11:
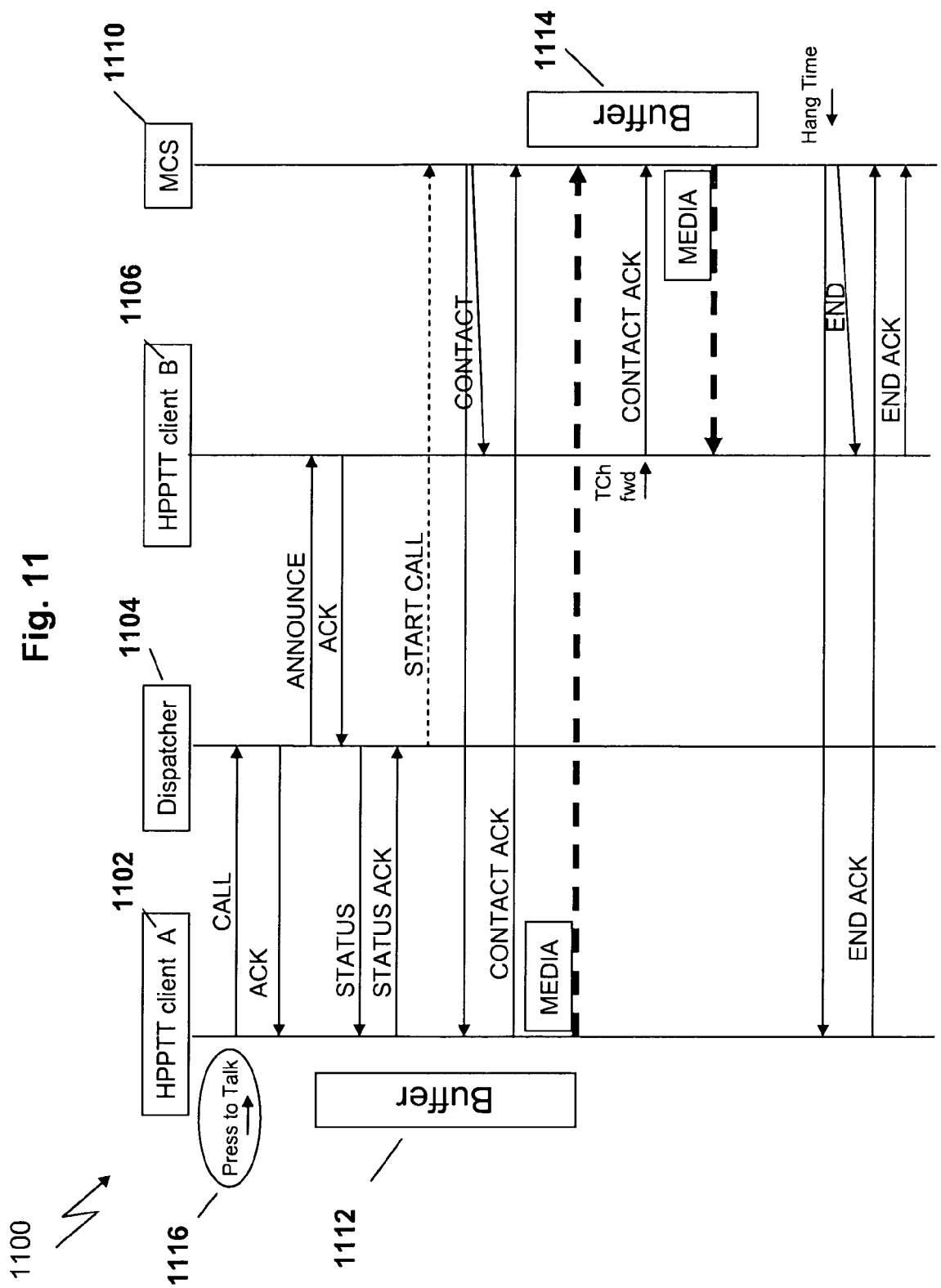
FIG. 11 illustrates the message sequence chart for a simulation of HPPTT set-up and termination.

FIG. 10 illustrates the HPPTT simulation architecture, including the simulated mobile 1000, cdma2000 radio access network 1026, and HPPTT server 1028. The HPPTT application 1002 comprises an HPPTT vocoder 1003, a PTT Signalling Protocol (PSP) 1004 used to initiate, modify and terminate PTT connections (Message Sequence Chart exemplified in FIG. 11) and a Media Signaling Protocol 1006 used for managing floor grant/release of established HPPTT calls (Message Sequence Chart exemplified in FIG. 12). Call signaling messages are transmitted via the reverse traffic and signaling channels already detailed above with respect to FIG. 4 (BS Module Architecture). Media signaling is delivered on the traffic channel. As the HPPTT application has its own specific protocols, there is minimal transaction with the SIP Protocol Stack 1008, location registrations being performed by the HPPTT application, and RTP 1010 protocols. Since PSP is specified to run over UDP it has to employ its own reliability mechanisms in order to insure proper message delivery. Numerous UDP messages are sent during a typical PTT call. The reverse ACK mechanisms detailed in FIG. 4 (BS Module Architecture) and previously described are employed. The UDP layer 1012 sits on top of the IP layer 1014, which is above the PPP layer 1016, corresponding to layer 2 of the OSI architecture. HPPTT clients have existing PPP connections wherein IP addresses are pre-assigned to the mobile.

Message sequence charts portray a "cause" and "effect" sequencing between the various actions performed in a typical software system. The message sequence chart 1100 for the embodiment of PTT call set-up and termination over a generic network simulator is detailed in FIG. 11. Three simulator modules are developed to support PSP functionalities: HPPTT clients 1102 and 1106, Dispatcher 1104 and media control server (MCS) 1110. This maps to an actual implementation where the user modules 1102 and 1106 may represent any two users in the network and the dispatcher 1104 and MCS 1110 functions are located in the server. Data buffers 1112 and 1114 are located at each of the client 1102 and 1106 locations and the MCS location 1110. Buffers such as 1112 and 1114 implanted at all servers and clients, are frequently used to optimise packet based voice systems. A jitter buffer temporarily stores arriving packets in order to minimize delay variations; in one strategy packets arriving too late are simply discarded, and in others attempts are made to re-construct them. Note that the packets may contain encoded speech and not raw speech samples. A jitter buffer needs to be accurately sized for system economics and performance. If a jitter buffer is too small then an excessive number of packets may be discarded, which can lead to call quality degradation. If a jitter buffer is too large then the additional delay can lead to conversational difficulty. A typical jitter buffer configuration is 30 mS to 50 mS in size. In the case of an adaptive jitter buffer then the maximum size may be set to 100-200 mS. Dispatcher 1104 is responsible for handling initial call set-up messages when the PTT button 1116 has been activated at either client 1102 or 1106. It is also responsible for notifying MCS 1110 to issue 'contact' messages to the clients on receipt of a 'status acknowledge' from the originating client 1102 as exemplified in FIG. 11. The MCS model 1110 is responsible for processing PTT requests from PTT clients and storing and forwarding media packets, relaying them between PTT clients. MCS 1110 is responsible for issuing 'contact' and 'end' messages to initiate and terminate the voice packet transmissions respectively. The client modules 1102 and 1106 are designed to handle both origination and destination PSP processes and are responsible for handling client-related PSP message requests and responses and interfaces directly with the umbrella PTT application to issue signalling messages and to relay back the message status. It should be noted that numerous UDP connections are established between the clients 1102 and 1106, the dispatcher 1104 and the MCS 1110. These are not shown in FIG. 11 for reasons of simplicity.

The time delay between a user PTT request and receiving a positive or negative confirmation from the server is a critical service parameter for half duplex communication systems. The two main PTT performance measures for the initial call set up process are (a) the initial PTT latency which is the time elapsed between the 'call' and 'status' messages and (b) the initial media latency which is the time to delivery of the first talk spurt. The simulation model includes specification of time-outs and number of re-tries for each signal.

Figure 12:
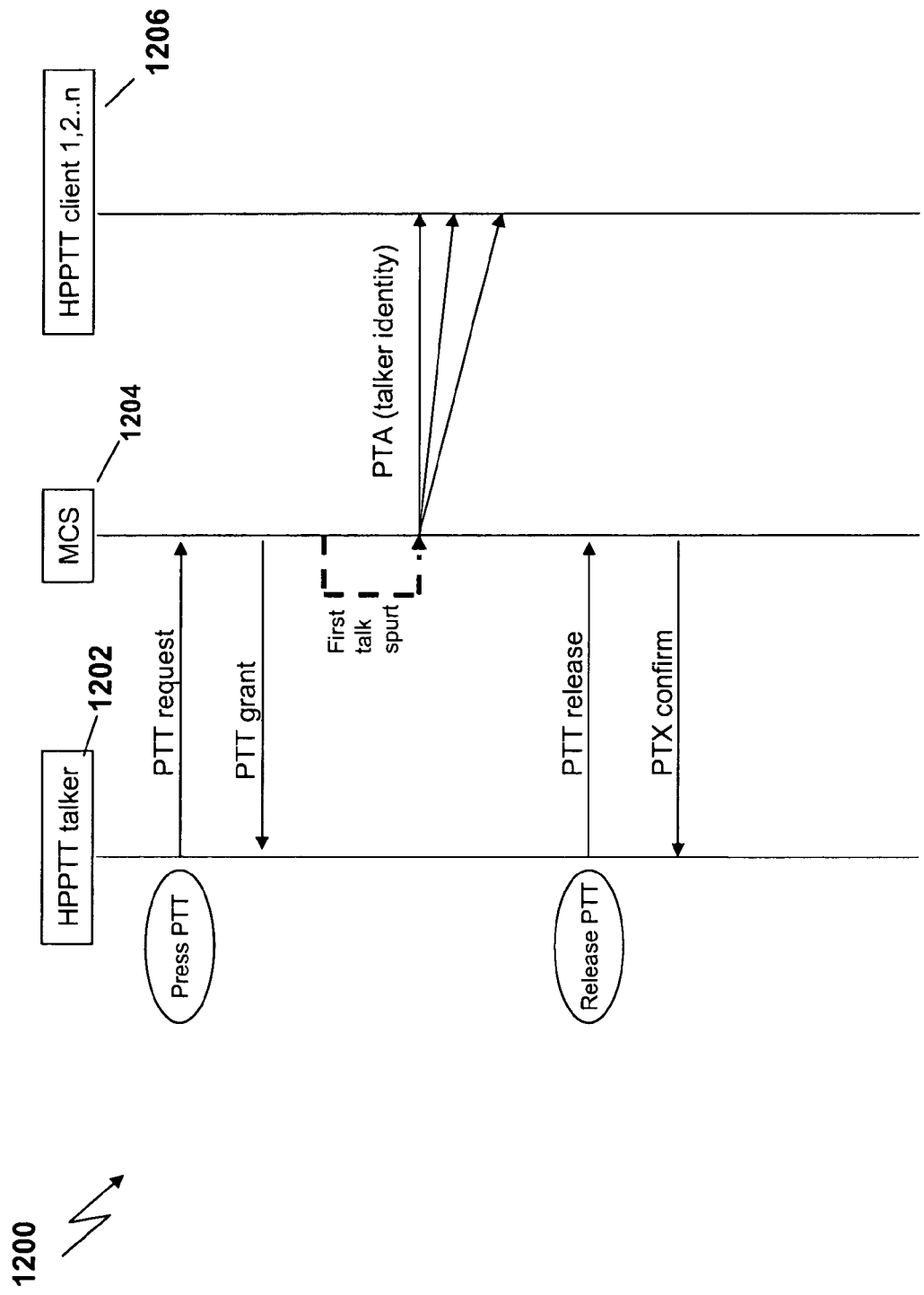
FIG. 12 illustrates the message sequence chart for a simulation of the granting and release of the floor for an HPPTT application.

The message sequence chart 1200 for the embodiment of PTT floor grant request and release over a generic network simulator is detailed in FIG. 12. A HPPTT talker 1202 on pressing the PTT button initiates a PTT request to the MCS 1204 which is required to respond with a PTT grant within a specified time-out interval and a specified number of re-tries. At the first received talk spurt, the MCS 1204 issues a PTA signal to all HPPTT clients 1206 identifying the talker. The talk floor is given up on release of the PTT button with a PTT release message sent from talker 1202 to MCS 1204, confirmed by MCS 1204 by issuance of a PTT release signal. A unified HPPTT signal message format for all PSP messages has been developed for the simulation. The different PSP messages are emulated by using varying the simulator's packet sizes. All PSP messages contain a header and an authentication suffix in addition to the data payload and the header and data can have varying lengths. For simplicity, a single packet format may be used to represent all PSP messages.

Figure 13:
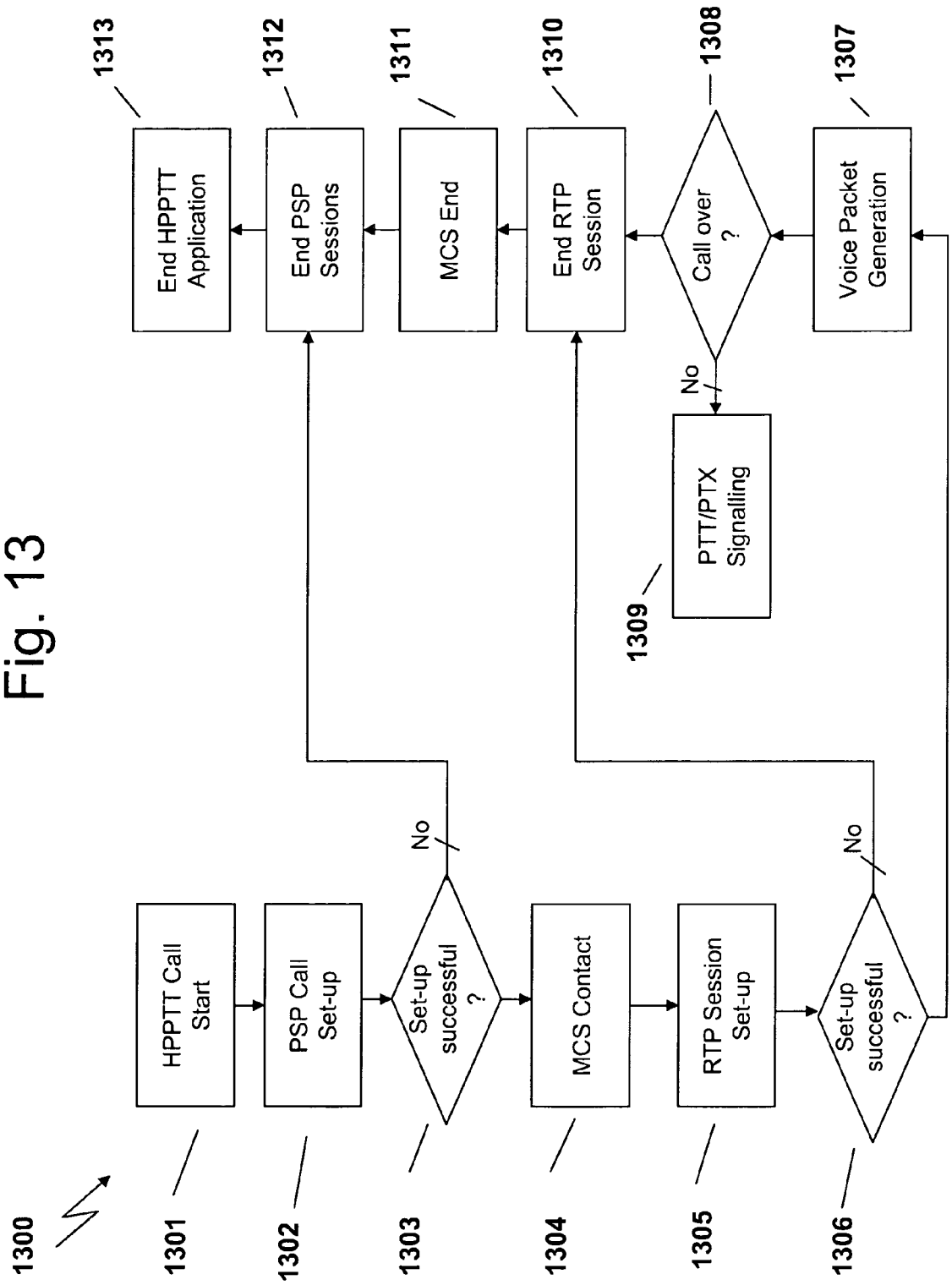
FIG. 13 illustrates one embodiment of an overall HPPTT application.

In this embodiment, the built-in support in a generic simulation engine for a VoIP application may be modified to mimic the HPPTT application behavior. Firstly, it may be modified to interface with PSP, and secondly it may be modified to mimic the half-duplexing behavior of PTT including conditions for signalling failures. Finally, FIG. 13 shows a flowchart 1300 depicting how an HPPTT call is processed within the simulator engine. In the beginning (1301) of a HPPTT call, the HPTT originating client starts the call by informing its PSP client module to initiate (1302) the PSP call set-up procedure. The PSP client starts the call set-up procedure by sending a CALL request to the specified dispatcher module. Once the initial set of PSP message exchanges is successful (1303), the dispatcher may inform (1304) the MCS module to issue CONTACT messages to the HPPTT clients involved in the call. The HPPTT origination client may then initiate (1305) an RTP Session set up procedure and start sending (1307) voice packets when the RTP session initiation is successful (1306). During the course of the call, the various PTT and PTX signaling messages occur (1309). At the end of the call (1308), the HPPTT origination client may initiate (1310) the RTP session end procedure. When the call is successfully terminated (1311), the HPPTT client may destroy the RTP child processes belonging to the call. The origination client then remotely interrupts the MCS module to issue (1312) PSP END messages to the client and the dispatcher. Once these END messages have been processed, the PSP module may close all active connections before also destroying themselves. Both HPPTT origination and destination application processes may then be terminated (1313).

One aspect of the invention is to produce complete "end to end" packet trace information along with user-defined performance metrics. Packet trace information may be used to reconstruct transmitted voice/video streams in order to examine the behaviour of the network long before it is actually built. Network performance can be evaluated so that impairments such as packet loss or erasure and delay jitter can be corrected, alternatively processing and/or buffering strategies employed to mitigate their effect. Additional post processing elements can be added to further enhance the analysis capability. It should be noted that media encoders and decoders do not form part of the invention; these can either be software products commercially available or internal developments.

While the method and system for providing a simulation platform for advanced cdma system performance evaluations have been described with the HPPTT exemplary embodiment, those skilled in the art will understand that many modifications and improvements in the light of these teachings are possible, and this application is intended to cover variations thereof. While certain exemplary embodiments have been described and shown in the accompanying drawings, it is to be understood that such embodiments are merely illustrative of and not restrictive to the broad invention. Accordingly, this invention should not be limited to the specific constructions and arrangements shown and described, since various other modifications may occur to those ordinarily skilled in the art.

What is claimed is:

1. A method for evaluating radio access network performance comprising:
    configuring a network simulation engine to simulate radio access network communications, wherein the network simulation engine is further to simulate reverse link mobile access control, and wherein further the network simulation engine is to include a base station controller module for simulating a base station controller and a base station module for simulating a base station;
    configuring a mobile device simulation module to simulate communications between mobile devices and radio access networks;
    configuring a network application simulation module to simulate network application functionality;
    linking the network simulation engine, mobile device simulation module and the network application simulation module to emulate end-to-end network communications;
    simulating soft handoffs, by at least one of the network simulation engine and mobile device simulation module, between a plurality of mobile devices and base stations; and
    generating expected network performance information based on outputs from one or more of the network simulation engine, mobile device simulation module and the network application simulation module, wherein the expected network performance information includes inter-cell hand-off performance information.

2. The method of claim 1 further comprising configuring the network application simulation module to simulate push-to-talk functionality.

3. The method of claim 1, wherein configuring the network simulation engine comprises configuring the network simulation engine to simulate a cdma2000 network.

4. The method of claim 1, further comprising configuring a scheduler module to assign forward link time slots and to handle re-transmission requests from the mobile device simulation module.

5. The method of claim 1 wherein the base station module is configured to,
    portray a three-sectored cell,
    manage multiple queues and segmentation buffers, and
    interface with the base station controller module during mobile inter-cell hand-off.

6. The method of claim 1 wherein the base station module is configured to,
    generate multicasts,
    manage variable packet sizes, and
    realize variable and multiple data rates.

7. The method of claim 1 further comprising configuring a channel emulator module to represent channel fading and multipath conditions.

8. The method of claim 7 further comprising configuring the channel emulator to calculate effects of mobile device movement, and to update channel fading condition based on a speed of movement.

9. A system evaluating radio access network performance comprising:
- a network simulation means comprising a base station controller emulation means for emulating a base station controller and a base station emulation means for emulating a base station, wherein the network simulation means is to:
  - simulate radio access network communications,
  - simulate reverse link mobile access control, and
  - simulate soft handoffs between a plurality of mobile devices and base stations;
- a mobile device simulation means to simulate communications between mobile devices and radio access networks;
- a network application simulation means to simulate network application functionality, wherein the network simulation means, mobile device simulation means and the network application simulation means are linked together to emulate end-to-end network communications; and
- a post-processor configured to process expected network performance information based on outputs from one or more of the network simulation means, mobile device simulation means and the network application simulation means, wherein the expected network performance information includes inter-cell hand-off performance information.

10. The system of claim 9 wherein the network application simulation means is further to simulate push-to-talk functionality.

11. The system of claim 9, wherein the network simulation means is further to simulate a cdma2000 network.

12. The system of claim 9, further comprising a scheduler means to assign forward link time slots and to handle retransmission requests from the mobile device simulation module.

13. The system of claim 9 wherein the base station emulation means is to,
- portray a three-sectored cell,
- manage multiple queues and segmentation buffers, and
- interface with the base station controller emulation means module during mobile inter-cell hand-off.

14. The system of claim 9 wherein the base station emulation means is to,
- generate multicasts,
- manage variable packet sizes, and
- realize variable and multiple data rates.

15. The system of claim 9 further comprising a channel emulator means to represent channel fading and multipath conditions.

16. The system of claim 15 wherein the channel emulator means is to calculate effects of mobile device movement, and to update channel fading condition based on a speed of movement.

17. The system of claim 9, wherein the mobile device simulation means, in conjunction with the network simulation means, is to simulate said soft handoffs between the plurality of mobile devices and base stations.

18. The method of claim 1, wherein simulating soft handoffs comprises simulating soft handoffs and softer handoffs, by at least one of the network simulation engine and mobile device simulation module, between the plurality of mobile devices and base stations.

* * * * *